United States Patent

Kasuga et al.

[11] Patent Number: 5,794,979
[45] Date of Patent: Aug. 18, 1998

[54] METHOD AND STRUCTURE FOR MOUNTING A FUEL TANK

[75] Inventors: Tatsuo Kasuga; Eisei Higuchi, both of Wako, Japan

[73] Assignee: Honda Giken Kogyo Kabushiki Kaisha, Tokyo, Japan

[21] Appl. No.: 532,971

[22] Filed: Sep. 22, 1995

[30] Foreign Application Priority Data

Sep. 30, 1994 [JP] Japan ................... 6-259580
Sep. 30, 1994 [JP] Japan ................... 6-259581

[51] Int. Cl.⁶ ........................... B60P 3/22
[52] U.S. Cl. ......................... 280/834; 180/69.5
[58] Field of Search ................... 180/311, 69.4, 180/69.5; 280/830, 831, 834, 781, 783, 785

[56] References Cited

U.S. PATENT DOCUMENTS 4,770,428  9/1988  Sugiyama ................... 280/834
5,443,578  8/1995  Davis, Jr. ................... 280/834
5,518,272  5/1996  Fukagawa et al. ........... 280/834

FOREIGN PATENT DOCUMENTS 214-811   10/1984  Germany ................... 280/834
58-101827  6/1983  Japan ..................... 280/830

*Primary Examiner*—Victor E. Johnson
*Attorney, Agent, or Firm*—Armstrong, Westerman, Hattori, McLeland & Naughton

[57] ABSTRACT

To mount a fuel tank storing a compressed fuel gas on an automobile, the tank is placed on a tank supporting frame and tightened to the frame by a belt, pipes neighboring with the tank and leak preventing seals are assembled with the tank, the tank supporting frame installed with the fuel tank is mounted and fixed on a car body, and then the pipes neighboring with the tank are connected to pipes of the car body side.

1 Claim, 11 Drawing Sheets

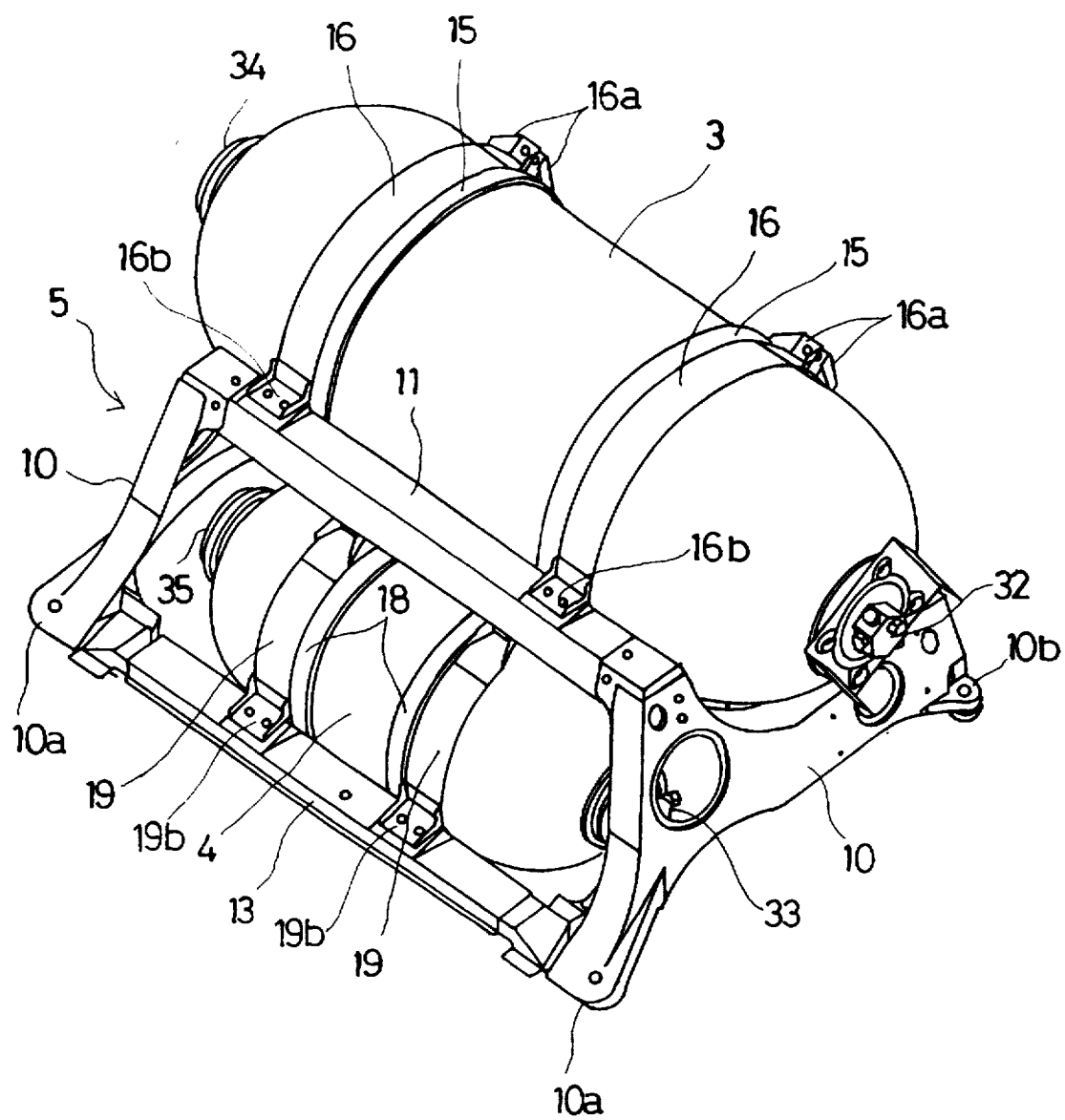
F I G. 3

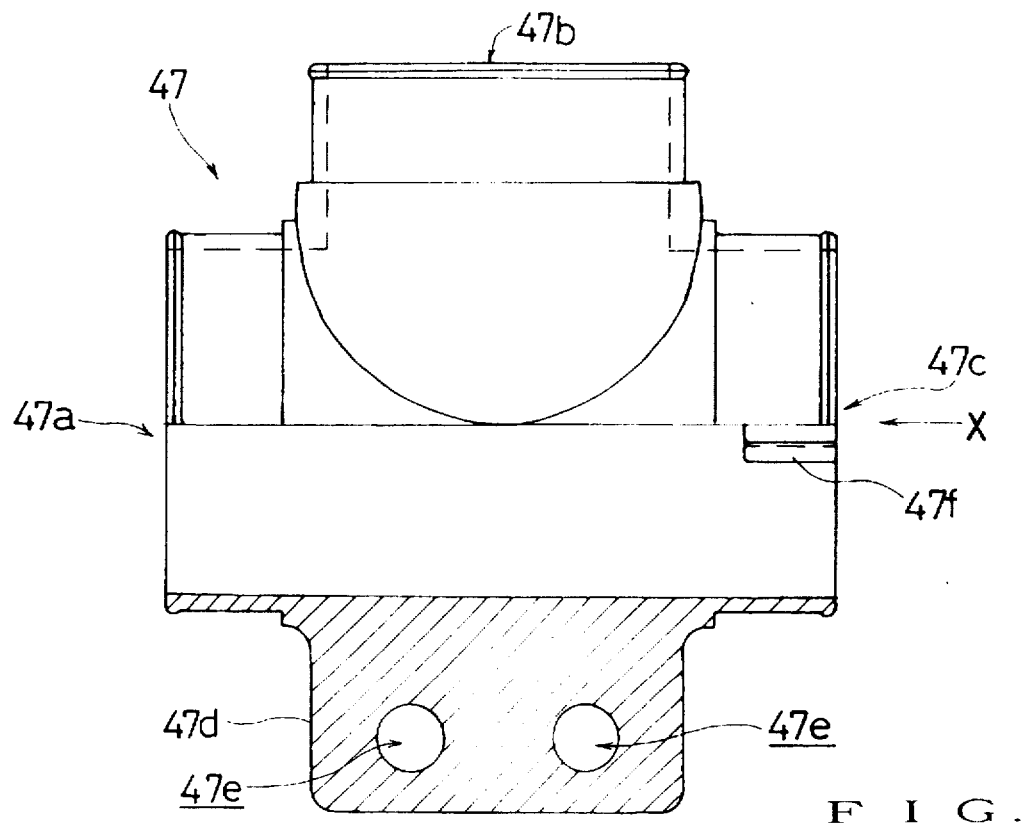
F I G. 9
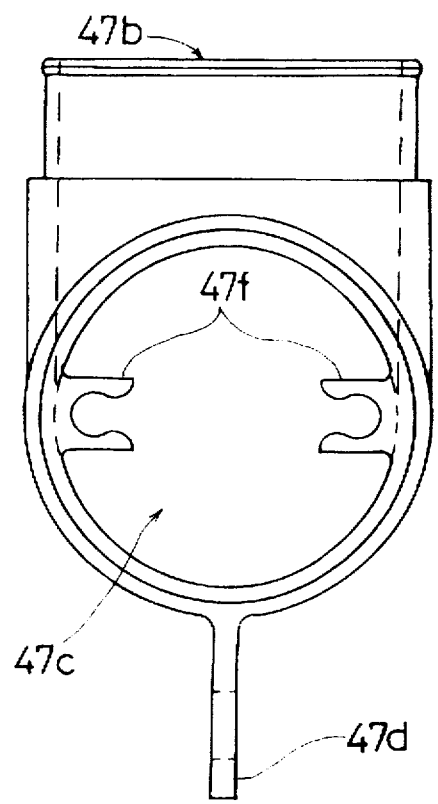
F I G. 10

METHOD AND STRUCTURE FOR MOUNTING A FUEL TANK

BACKGROUND OF THE INVENTION

The present invention relates to a method and structure for mounting a fuel tank which stores a compressed fuel gas (such as, compressed natural gas (CNG)) to a car body.

As shown in FIG. 8, CNG fuel tanks 01 was mounted on a car body 02 by means of brackets 03 one by one. The fuel tank 01 is fitted and supported on a bracket 03 of a semi-circular shape previously mounted on the car body 02 and then tightened and fixed by means of the other bracket 04 of a semi-circular shape.

The brackets 03,04 for each fuel tank are also connected to each other to ensure a rigid construction. Since the fuel tanks 01 are mounted and fixed one by one as described above, pipes around tank are arranged after all fuel tanks 01 have been mounted.

Because the fuel tanks 01 were mounted separately, the tanks 01 had to be separately installed and fixed and the work and time required to assemble such tanks were significant. As piping in the neighborhood of tanks was carried out after all fuel tanks 01 had been mounted, it was difficult to ensure a sufficient space for working and one had to often work at an unreasonable posture often. Further, the working efficiency was inferior and it was difficult to accurately connect the pipes.

Therefore, an object of the present invention is to provide a method and structure for installing the fuel tanks by which improvements of efficiency of assembling work, certainty of piping and workability can be attempted.

SUMMARY OF THE INVENTION

In order to achieve the above object, according to the present invention, there is provided a method for mounting a fuel tank storing a compressed fuel gas on an automobile, comprising a tank installing step wherein said fuel tank is placed on a tank supporting frame and tightened to said frame by a belt, a pipe and seal installing step wherein pipes neighboring with the tank and leak preventing seals are assembled with the tank, a frame fixing step wherein the tank supporting frame installed with the fuel tank is mounted and fixed on a car body, and a pipe connecting step wherein the pipes neighboring with the tank are connected to pipes of the car body side.

Since fuel tanks placed and tightened on the tank supporting frame, having pipes in the neighborhood of the tank connected and sealed are mounted on the car body as one body, it is unnecessary to install each fuel tank one by one to the car body and hours and labors for assembling works can be reduced. Since pipes in the neighborhood of the tank are connected before the tank is mounted to the car body, a sufficient working space can be ensured and a sure piping work with a high working efficiency is possible. After the fuel tank is mounted on the car body, it is only necessary to connect ends of pipes which is already connected to the tank to pipes of the car body side so that working efficiency is not obstructed in general.

In the above-mentioned frame fixing step, by inserting the tank supporting frame combined with the fuel tank integrally through the car body opening (such as, a rear window opening), a door opening or a car body under opening and fixing it on the rear floor of the car body, the fuel tank combined with the tank supporting frame integrally can be easily inserted into the car body cover and the tank can be fixed on the rear floor by means of the tank supporting frame.

BRIEF DESCRIPTION OF THE DRAWINGS

FIG. 3 is a perspective view of the fuel cylinders installed on the supporting frame;

FIG. 9 is a partly sectional side view of a seal boot branching joint;

FIG. 10 is a view of the seal boot branching joint as viewed in the direction of arrow X of FIG. 9;

DETAILED DESCRIPTION OF THE PREFERRED EMBODIMENT

Hereinafter a preferred embodiment of the present invention will be described with reference to FIGS. 1 to 7. The automobile, according to the preferred embodiment, runs using a natural gas, which is principally composed of methane gas and lighter than air as the fuel, and has a fuel cylinder, which is a compressed fuel tank adapted to be charged with the natural gas compressed at a pressure of about 200 kg/cm$^2$.

Figure 1:
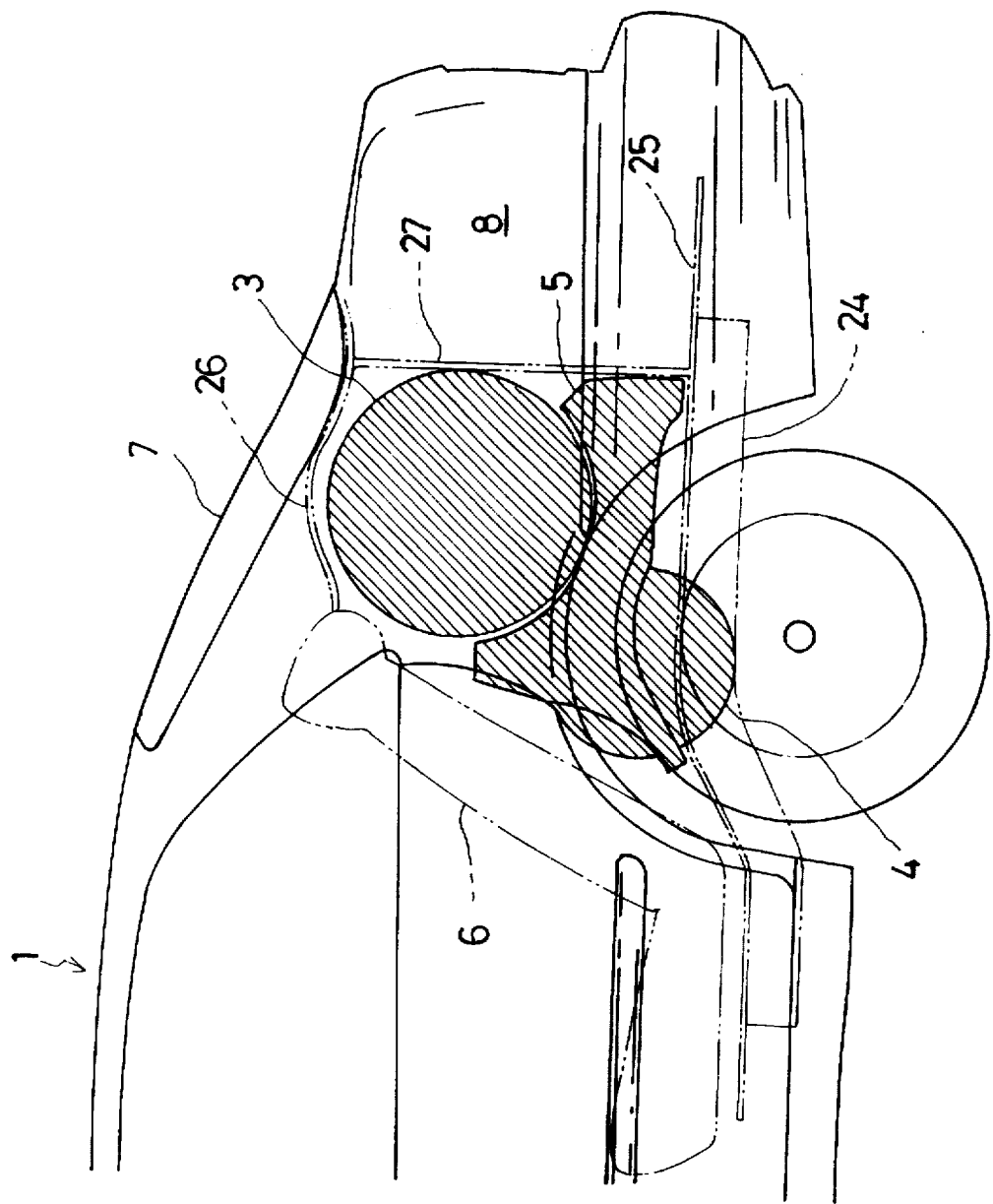
FIG. 1 is an explanatory view showing a side of a rear half part an automobile according to a preferred embodiment of the present invention.

FIG. 1 is an explanatory view showing positions of fuel cylinders at a side of a rear part of the automobile 1. Large and small fuel cylinders 3,4 are supported on a supporting frame 5 and arranged on a rear floor 25 supported by rear side frames 24 behind a rear seat 6 at a position between right and left rear wheel houses. The upper and rear parts of the fuel cylinder 3 are partitioned by rear bulkheads 26,27. Reference numbers 7 and 8 denote a rear window and a rear trunk room respectively.

Figure 2:
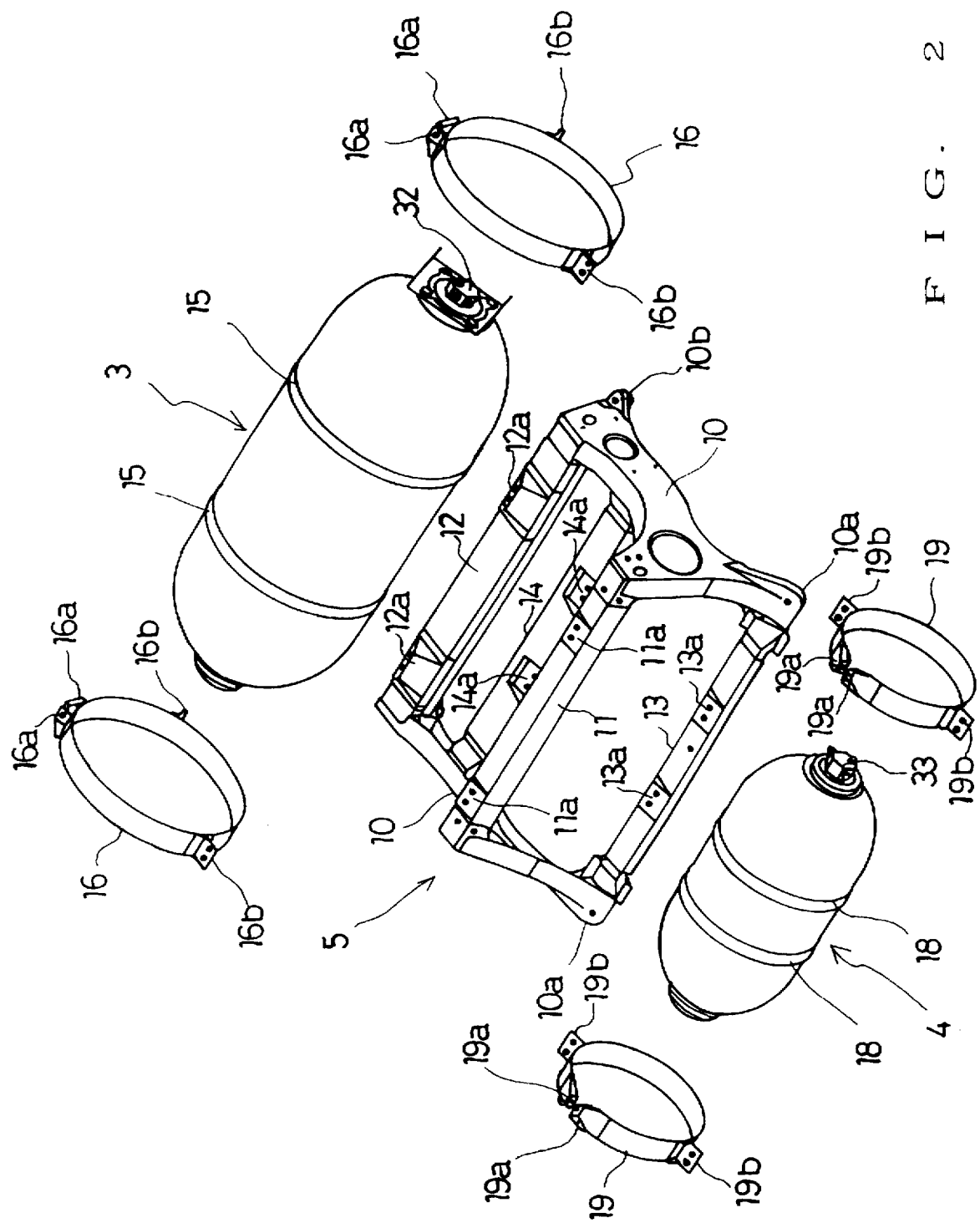
FIG. 2 is a disintegrated perspective view of fuel cylinders and a supporting frame just before the fuel cylinders are installed on the supporting frame.

Steps for installing the fuel cylinders 3,4 to the car body will be described in order with reference to FIGS. 2 to 7. FIG. 2 is a disintegrated perspective view of the fuel cylinders 3,4 and the supporting frame 5 just before the fuel cylinders are installed on the supporting frame. The fuel cylinders 3,4 are installed on the supporting frame 5, first of all.

The supporting frame 5 is constructed integrally of right and left side supporting frames 10,10 facing each other and cross-members 11,12,13,14 connecting the side supporting frames 10,10 at before and behind. The side supporting frame 10 has a side shape like a mountain having the summit at a front. The front slope of the mountain (side shape of the frame 10) is short while the rear slope is long and extends rearward. The peripheral edge of the frame 10 is bent toward inside to give a high rigidity to the frame. Attaching parts 10a,10b to the car body are formed at front and rear end portions.

The summits of right and left side supporting frames 10,10 are connected by the cross-member 11, the rear slopes by the cross-member 12, the front slopes by the cross-member 13 and rear bottom portions by the cross-member 14. On each of the cross-members 11,12,13,14 are formed a pair of attaching bosses 11a,12a,13a,14a having attaching holes, respectively.

Endless rubber belts 15,15 are fitted round the larger fuel cylinder 3 at predetermined right and left positions and bracketed bands 16,16 for fixing are wound over the rubber belts 15,15 and tightened. The bracketed band 16 has buckles 16a, 16a at both ends and fixing brackets 16b,16b at predetermined two positions. After the bracketed band 16 is wound over rubber belt 15 fitted round the fuel cylinder, the buckles 16a, 16a facing each other are connected by a bolt and tightened.

The fuel cylinder 3 with the bracketed band 16 wound is positioned between the cross-members 11,12 of the supporting frame 5 so that the front and rear brackets 16b,16b of the band 16 abut on the attaching parts 11a, 12a of the cross-members 11, 12 and the brackets 16b,16b and the attaching parts 11a, 12a are connected by bolts for installing the fuel cylinder 3 on the supporting frame 5.

In the same manner, bracketed bands 19 are wound around the smaller fuel cylinder 4 putting rubber belts 18 between the bands 19 and the fuel cylinder 4 and the fuel cylinder 4 is positioned between the cross-members 13,14 so that the brackets 19b,19b of the band 16 abut on the attaching parts 13a,14a of the cross-members 13,14 and the brackets 19b,19b and the attaching parts 13a,14a are connected by bolts for installing the fuel cylinder 3 on the supporting frame 5. Thus, the larger and smaller fuel cylinders 3,4 are installed on the supporting frame 5, as shown in FIG. 3.

Figure 4:
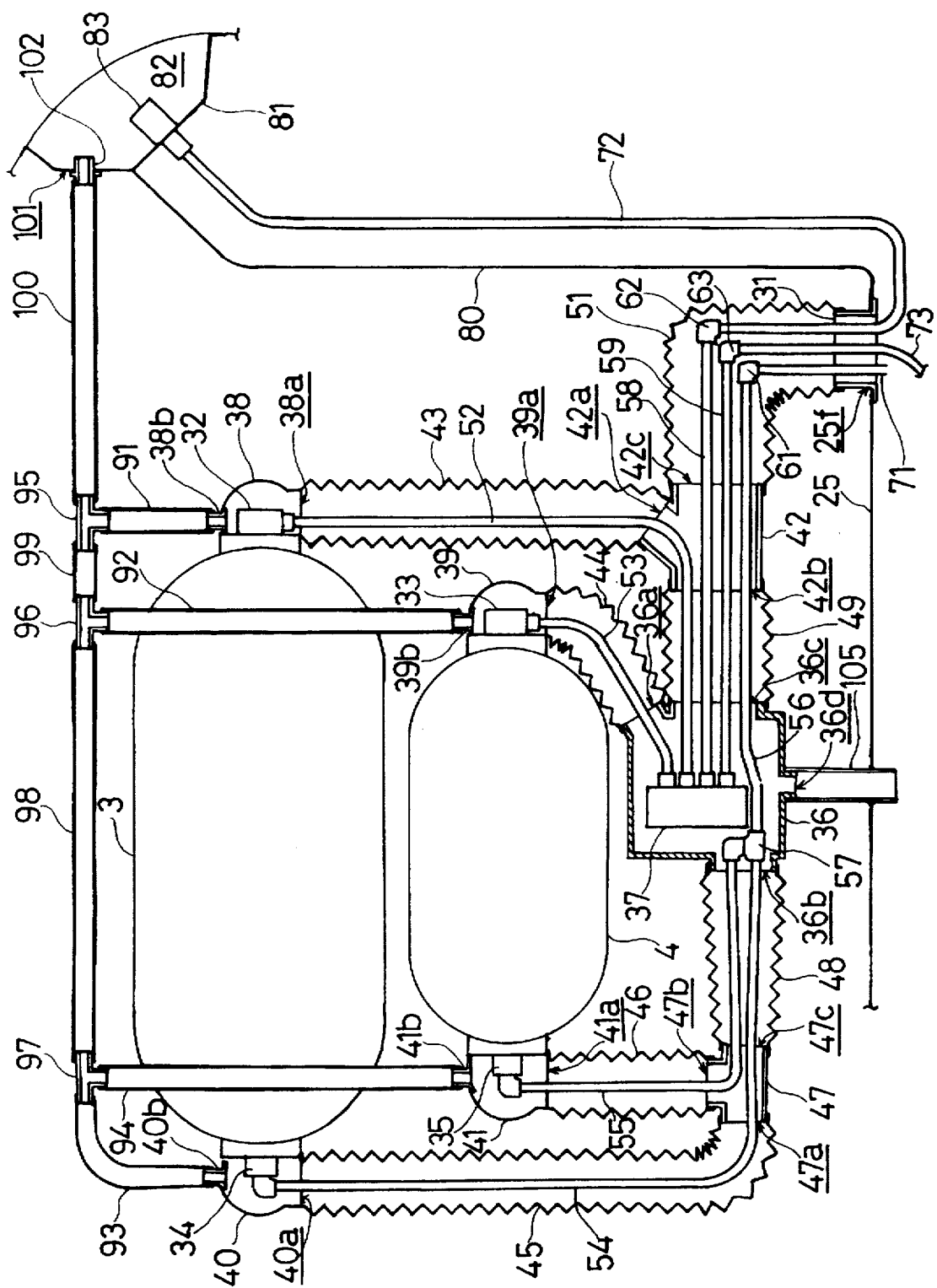
FIG. 4 is a view showing an arrangement of pipes and leak prevention seals of the fuel cylinder.
Figure 5:
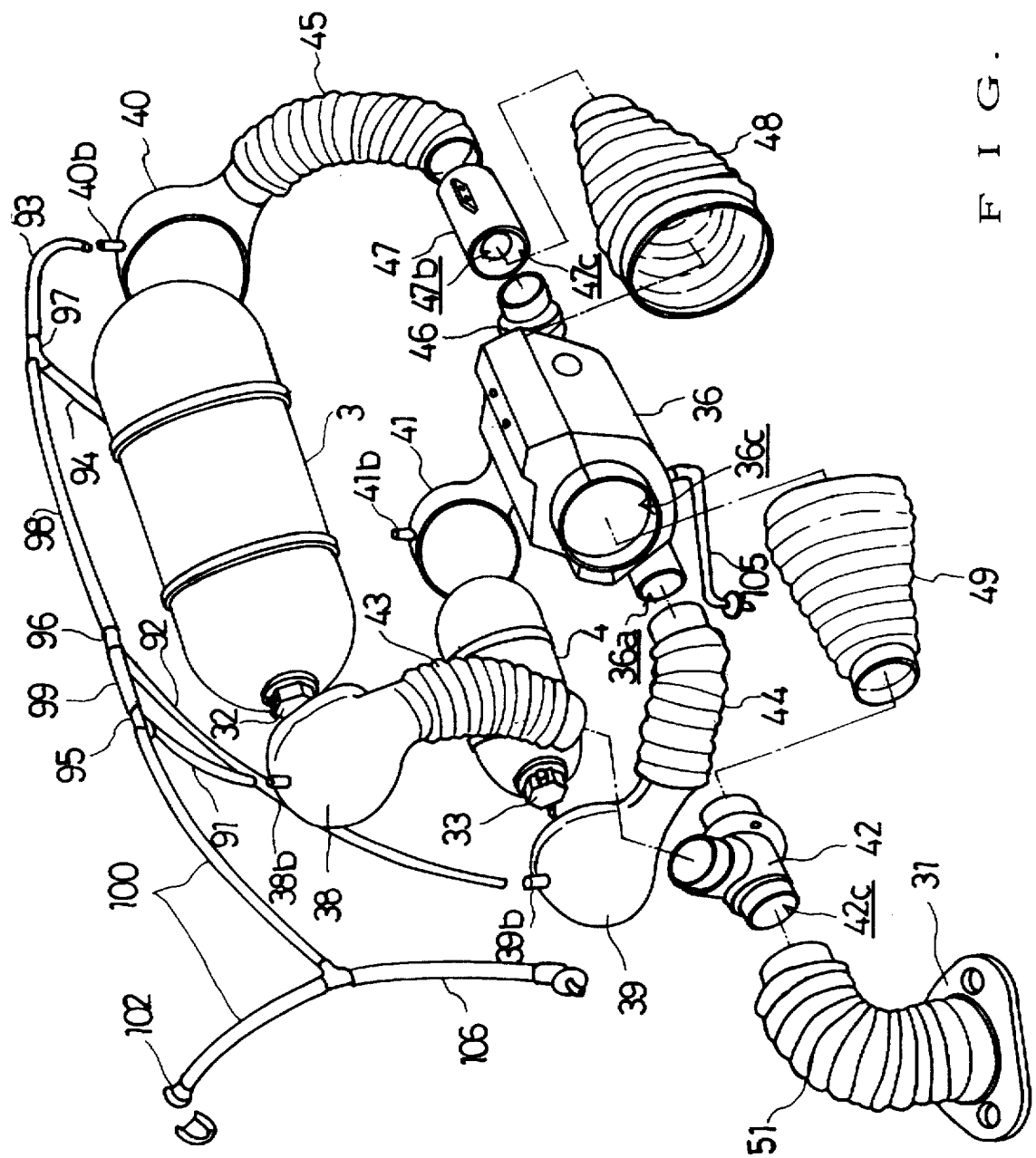
FIG. 5 is a disintegrated perspective view of the leak prevention seals in the neighborhood of the fuel cylinder.

Next, the installation of pipes and leak prevention seals neighboring with the fuel cylinder 3,4 is carried out. FIG. 4 is a view showing an arrangement of pipes and leak prevention seals of the fuel cylinders 3,4 and FIG. 5 is a disintegrated perspective view of the leak prevention seals.

At left ends (right ends in FIGS. 2 to 4) of the fuel cylinders 3,4 are installed normally closed solenoid valves 32,33 respectively, and at right ends of the fuel cylinders 3,4 are installed relief valves 34,35, respectively. The normally closed solenoid valves 32,33 are closed when they are not electrified and opened when electrified. The relief valves 34,35 are opened when the pressures in the fuel cylinders 3,4 rise above a predetermined set pressure for discharging the charged fuel in the fuel cylinders 3,4.

A seal box 36 composed of divided two parts is arranged behind the fuel cylinder 4. The seal box 36 is provided with a compressed natural gas supply auxiliary unit 37 in which a filter for filtering natural gas, sensors for detecting pressure and temperature in the fuel cylinders 3,4 and instruments necessary for charging compressed natural gas into the fuel cylinders 3,4 and supplying the natural gas from the fuel cylinders 3,4 to an internal combustion engine.

At both ends of the fuel cylinders 3,4 are installed valve coverings 38,39,40,41, which cover the normally closed solenoid valves 32,33 and the relief valves 34, 35 air- and watertightly, respectively. An opening 38a of the valve covering 38 and an opening 42a of a seal boot branching joint 42 are communicatively connected to each other by a seal boot 43. Further, an opening 39a of the valve covering 39 and an opening 36a of the seal box 36 are communicatively connected to each other.

In addition, an opening 40a of the valve covering 40 and an opening 41a of the valve covering 41 are communicatively connected to openings 47a,47b of a seal boot branching joint 47 by seal boots 45,46, respectively. An opening 47c of the seal boot branching joint 47 and an opening 36b of the seal box 36 are communicatively connected to each other by a seal boot 48, an opening 36c of the seal box 36 and an opening 42b of the seal boot branching joint 42 are by a seal boot 49. An opening joint 31 is fitted in an opening 25f of the rear floor 25 and the opening joint 31 and an opening 42c of the seal boot branching joint 42 are communicatively connected to each other by a seal boot 51.

A compressed natural gas charging and supplying pipe 52 passes through the seal boot 43, the seal boot branching joint 42 and the seal boot 49. Both ends of the pipe 32 are connected to the normally closed solenoid valve 32 in the valve covering 38 and the compressed natural gas supply auxiliary unit 17 in the seal box 36, respectively. Both ends of a compressed natural gas charging and supplying pipe 53 passing through the seal boot 44 are connected to the normally closed solenoid valve 13 in the valve covering 39 and the compressed natural gas supply auxiliary unit 37 in the seal box 36, respectively.

Further, an end of a relief pipe 54 passing through the seal boot 45, the seal boot branching joint 47 and the seal boot 48 is connected to the relief valve 34 in the valve covering 40, and an end of a relief pipe 55 passing through the seal boot 46, the seal boot branching joint 27 and the seal boot 28 is connected to the relief valve 35 in the valve covering 41. The other ends of the relief pipes 54,55 are connected to an end of a relief pipe 56 through a pipe joint 57. The relief pipe 56 passes through the seal boot 49 and the seal boot branching joint 42 and is connected to a relief pipe 71 through a connector 61 in the seal boot 51. The other end of the relief pipe 71 passing through the opening joint 31 is exposed to the outside of the car.

The compressed natural gas charging pipe 58 and the compressed natural gas supplying pipe 59 extending from the compressed natural gas supply auxiliary unit 37 pass through the seal boot 49 and the seal boot branching joint 42, and are connected to a compressed natural gas charging pipe 72 and a compressed natural gas supplying pipe 72 which enter from the under side through the opening joint 31 by means of connectors 62,63. The compressed natural gas charging pipe 72 extends upward along a trunk side wall 80 and penetrates a filler wall 81 to be exposed to a filler recess 82. At the exposed end of the compressed natural gas charging pipe 72 is attached a compressed natural gas charging valve 83. The compressed natural gas supplying pipe 73 extending downwardly from the opening joint 31 extends forward along the under surface of the rear floor 25 to be connected to a not shown internal combustion engine mounted on a front portion of the automobile 1.

Ends of leak natural gas discharging tubes 91,92,93,94 made of flexible rubbers are connected to tube connecting portions 38b,39b,40b,41b of the valve covering 38,39,40,41, respectively. The other ends of the leak natural gas discharging tubes 91,92,93,94 are connected to a leak natural gas discharging line composed of leak natural gas discharging tubes 98,99 and 100 by means of pipe joints 97,96,95. The tip end of the leak natural gas discharging tube 100 is connected to a filler opening 101 in the filler recess 82 by means of a pipe joint 102.

To a lower opening 36d of the seal box 36 is connected an upper end of a drain pipe 105 which penetrates the rear floor 35. The lower end of the drain pipe 105 is exposed to the outside of the car body, and water condensed in the seal boots 43,44,45,46,48,49 and the seal box 36 is discharged through the drain pipe 105 to the outside of the car. As shown in FIG. 5, a drain pipe 106 which branches from the leak natural gas discharging tube 100 may be provided.

Figure 6:
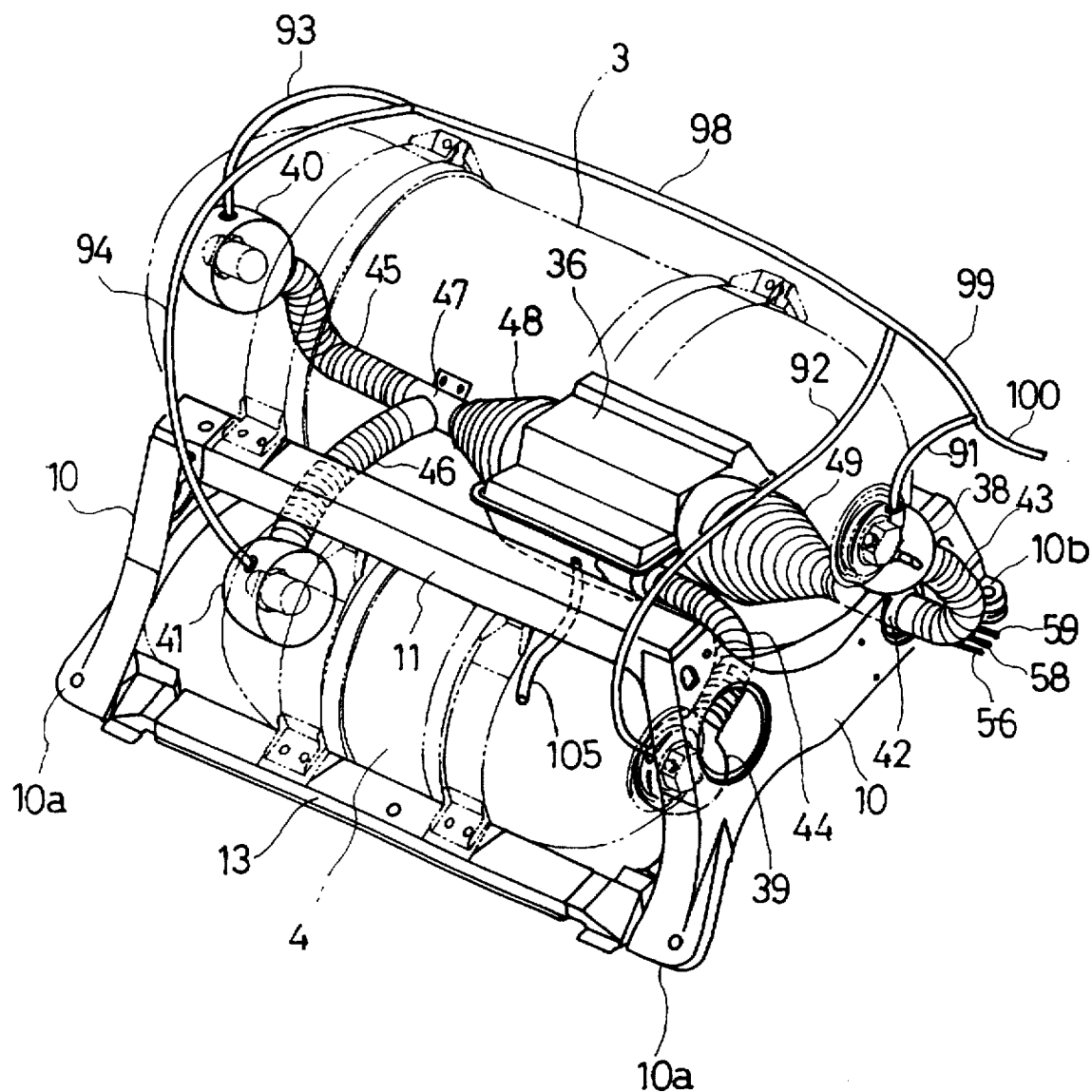
FIG. 6 is a perspective view of the fuel cylinder and the supporting frame in the state that pipes and leak prevention seals neighboring with the fuel cylinder have been installed.

FIG. 6 shows an assembly of the fuel cylinders 3,4 and the supporting frame 5 with the pipes and leak prevention seals neighboring with the tank already attached. This assembly is pre-inserted as one body through the rear window opening and mounted on the rear floor 25.

At this time, the seal boot 51 is connected to an opening 25f (FIG. 7) of the rear floor 25 on the car body side through the opening joint 31 and on the fuel cylinder side, ends of the relief pipe 56, the compressed natural gas charging pipe 58 and the compressed natural gas supplying pipe 59 are exposed to the outside from the seal boot branching joint 42. The tip end of the leak natural gas discharging tube 100 and the drain pipe 105 are also left free.

The rear window opening has an area allowing insertion of the fuel cylinders 3,4 supported on the supporting frame as one body, and the mounting position of the fuel cylinders 3,4 is directly below the rear window opening. Accordingly, the mounting work can be readily performed.

Figure 7:
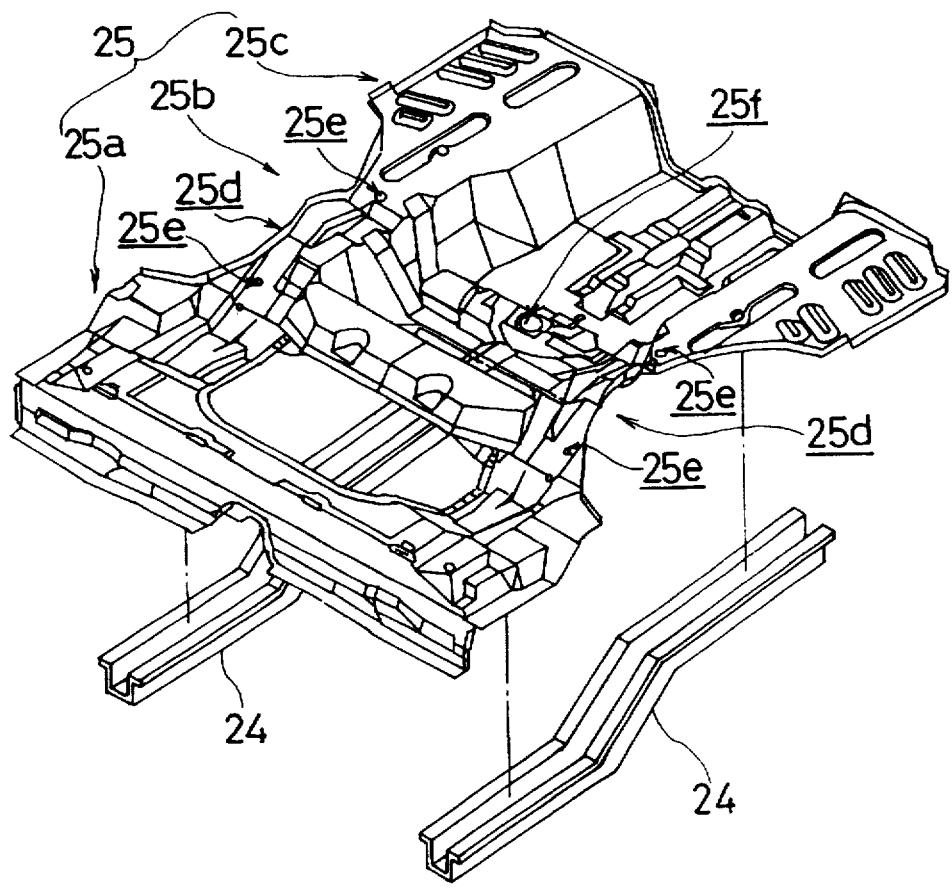
FIG. 7 is a perspective view of a rear floor and rear side frames.
Figure 8:
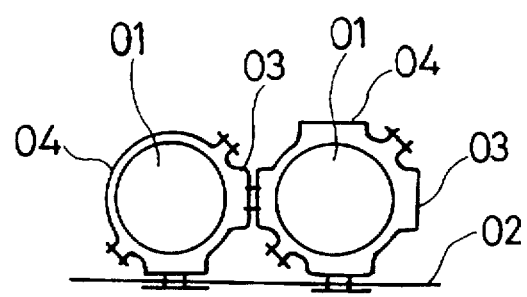
FIG. 8 is a side view of an essential part showing a customary construction for installing fuel tanks.

In FIG. 7, the front portion 25a of the rear floor 25 to be positioned under the rear seat 6 is a place for housing a spare tire, right and left recesses 25d,25d in the middle portion 25b correspond to rear wheel houses, the space between the recesses 25d,25d is the place for arranging the fuel cylinders 3,4 and the rear portion 25c constitutes a bottom wall of the trunk room 8. The rear floor 25 is supported on a pair of right and left rear side frames 24,24 directing in the before and behind direction.

The right and left side supporting frames 10,10 of the supporting frame 5 are positioned on side edge portions along the right and left recesses 25d,25d of the middle portions 25b with the front and rear attaching parts 10a,10b, of the side supporting frames 10 put on front and rear attaching holes 25e,25e formed on the side edge portions. The supporting frame 5 with the fuel cylinders 3,4 attached is tightened to the rear floor 25 together with the lower rear side frames 24 by bolts to be fixed to the car body.

Next, connection of ends of pipes provided in the neighborhood of the fuel cylinders 3,4 is carried out. As shown in FIG. 7, there is a opening 25f at a rear central position of the middle portion of the rear floor 25 and the opening joint 31 is fitted to the opening 25f so that the seal boot 51 extends upward from the opening 25f. Ends of pipes on the car body side, that is, the relief pipe 71, compressed natural gas charging pipe 72 and the compressed natural gas supplying pipe 73 passing through the seal boot 51 from the outside and ends of the relief pipe 56, compressed natural gas charging pipe 58 and the compressed natural gas supplying pipe 59 are connected by the connectors 61,62,63 and the end of the seal boot 51 is connected to a opening 42c of the seal boot branching joint 42.

Since the opening 25f is formed at the rear central position of the middle portion 25b of the rear floor and from the same position upwardly extend the relief pipe 71, the compressed natural gas charging pipe 72, compressed natural gas supplying pipe 73 and the seal boots, the above connecting work can be carried out easily from the side of the trunk room 8.

The tip end of the leak natural gas discharging tube 100 is connected to the filler opening 101 of the filler wall 82 by the pipe joint 102. The tip end of the drain pipe 105 is fitted in a hole provided on the rear floor 25 separately.

As described above, pipe connection, after the fuel cylinders 3,4 are mounted on the car body, is also simple and the workability is good.

Although the fuel cylinders 3,4 installed on the supporting frame 5 is inserted through the rear window opening together with the pipes and leak prevention seals in this embodiment, they may be inserted through another opening having a sufficient opening area (such as as the door opening and the rear floor opening), to be mounted on a predetermined position of the rear floor 25. However, the rear window opening is most suitable in term of of the workability.

As shown in FIGS. 9 and 10, the seal boot branching joint 47 has openings 47a,47c at both ends of a straight cylindrical portion and a opening 47b at an end of a cylindrical portion branched from the straight cylindrical portion. A rectangular flange 47d having two attaching holes 47e is projected from the straight cylindrical portion.

On the inner peripheral surface of the opening 47c are projectively formed pipe fixing portions 47f,47f opposite to each other. Each fixing portion 47f has a pair of fixing claws for pinching and holding the pipe.

Two relief pipes 54,55, passing through the seal boot branching joint 47, are pinched and held by the pipe fixing portion 47f,47f, respectively, to be fixed to the boot branching joint 47.

Figure 11:
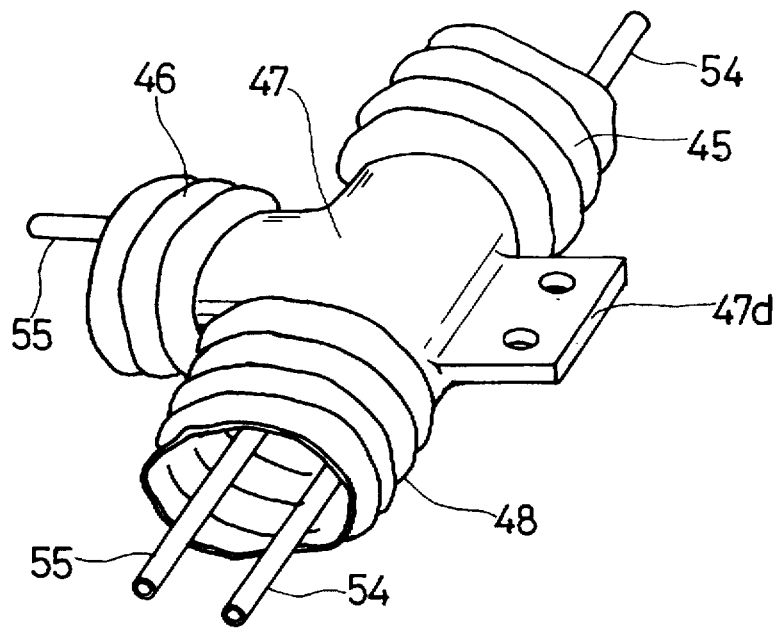
FIG. 11 is a perspective view showing a state in use of the seal boot branching joint.

The seal boots 45,46,48 are jointed to the openings 47a, 47b, 47c of the seal boot branching joint 47, respectively, as shown in FIG. 11.

Figure 12:
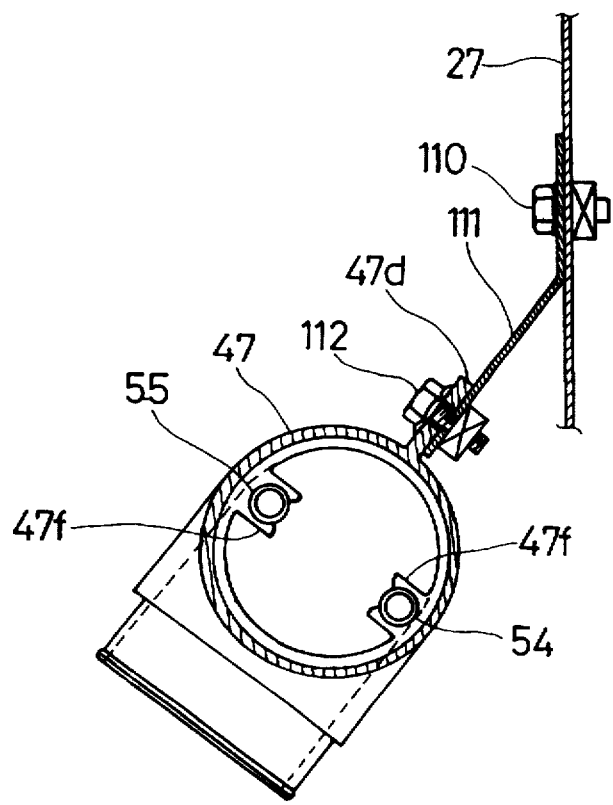
FIG. 12 is a sectional view showing a fixed state of the seal boot branching joint.

As shown in FIG. 12, a stay 111 is projected from the rear bulkhead 27 with its base end fixed to the bulkhead by a bolt-nut 110, the flange 47d of the seal boot branching joint 47 is fixed to the other end of the stay 111 by a bolt-nut 112, and thus the seal boot branching joint 47 is fixed to the car body.

Since the relief pipes 54,55 in the seal are fixed to the car body utilizing the seal boot branching joint 47, as described above, the relief pipes 54,55 can be fixed to the car body surely without providing any through hole in the seal boot and the like. The seal boot branching joint 47, which is a generally used joint member, is utilized so that a special exclusive fixing member is not required.

The above-mentioned seal boot branching joint 42 to be fixed to the supporting frame 5 also has similar pipe fixing portion for fixing the compressed natural gas charging and supplying pipe 52, the relief pipe 56, the compressed natural gas charging pipe 58 and the compressed natural gas supplying pipe 59.

The relief pipe 71, the compressed natural gas charging pipe 72 and the compressed natural gas supplying pipe 73, which are connected to the relief pipe 56, the compressed natural gas charging pipe 58 and the compressed natural gas supplying pipe 59 on the side of the fuel cylinders by means of the connectors 61,62,63 are fixed to the rear floor 25 through the opening joint member 31.

Figure 13:
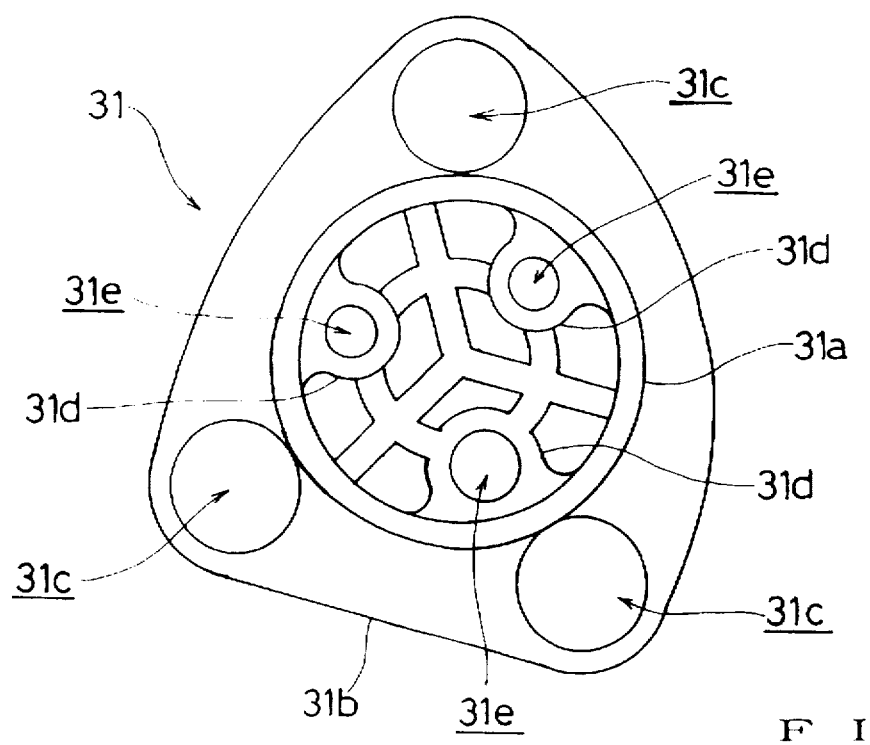
FIG. 13 is a plan view of an opening joint member.
Figure 14:
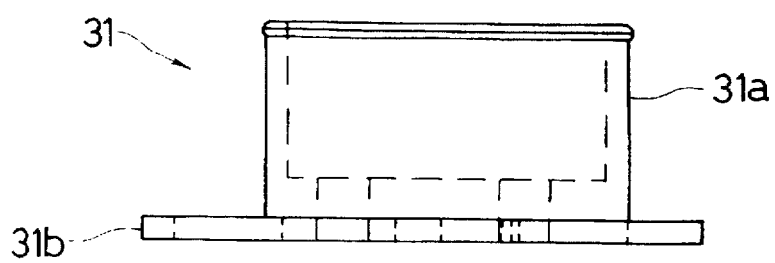
FIG. 14 is a side view of the opening joint member.
Figure 15:
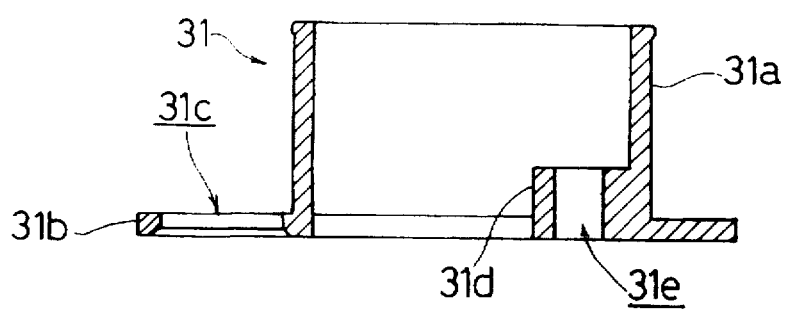
FIG. 15 is a sectional view of the opening joint member.
Figure 16:
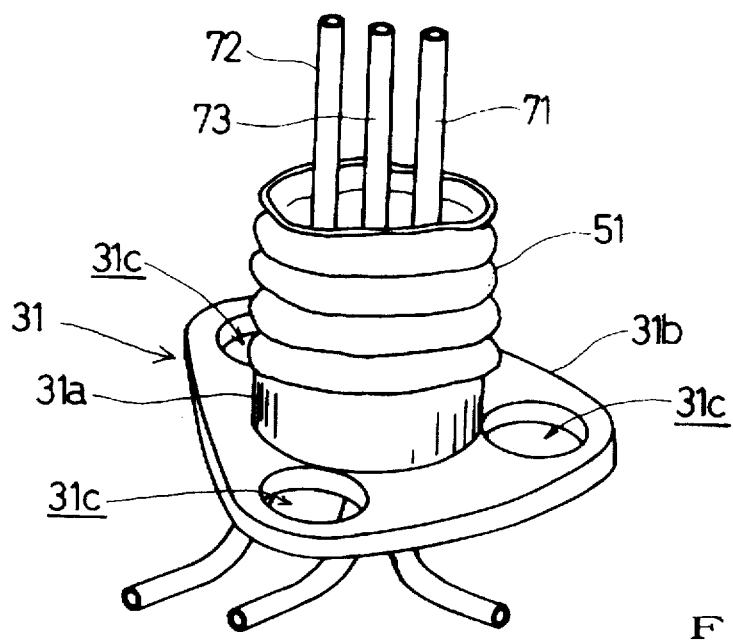
FIG. 16 is a perspective view showing a state in use of the opening joint member.

As shown in FIGS. 13 to 15, the opening joint member 31 has a substantially triangular flange 31b formed on an open end of a cylindrical portion 31a. The flange 31b has attaching holes 31c at three corners thereof.

Three pipe fixing portions 31d are formed inside of the cylindrical portion 31a at the end having the flange 31b. The pipe fixing portions 31d have round holes 31e extending in axial direction of the cylindrical portion. The relief pipe 71, the compressed natural gas charging pipe 72 and the compressed natural gas supplying pipe 73 pass through and are fixed to the round holes 31e respectively to be fixed to the opening joint member 31.

Figure 17:
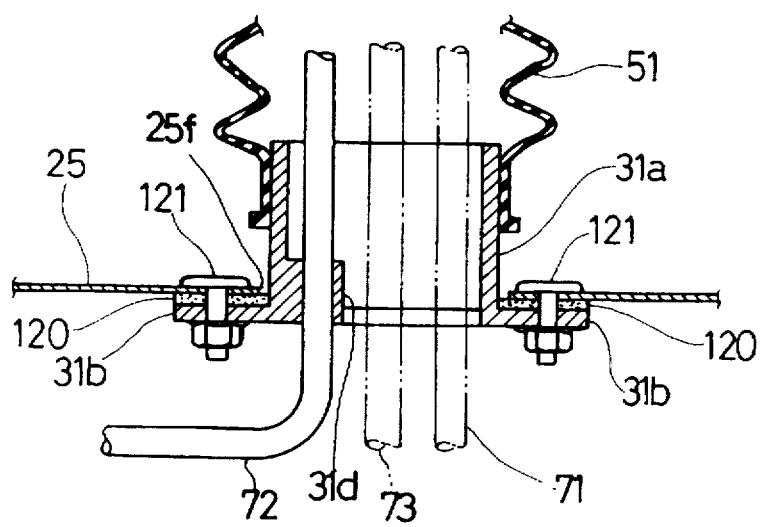
FIG. 17 is a sectional view showing a fixed state of the opening joint member.

As shown in FIG. 17, the opening joint member 31 is inserted into the opening portion 25f of the rear floor 25 from the under side, and the flange 31b is abutted on the peripheral edge of the opening portion 25f putting a seal member 120 between them and fixed to the rear floor 25 by a bolt-nut 121.

Since the relief pipe 71, the compressed natural gas charging pipe 72 and the compressed natural gas supplying pipe 73 in the seal are fixed to the car body utilizing the opening joint member 31 as described above, the relief pipe 71, the compressed natural gas charging pipe 72 and the compressed natural gas supplying pipe 73 can be fixed to the car body surely without providing any through hole in the seal boot and the like.

Although the above-described embodiment relates to a vehicle using methane gas lighter than air as the fuel, the present invention can be also applied to a vehicle using other gas heavier than air such as propane gas.

While the invention has been particularly shown and described in reference to preferred embodiments thereof, it will be understood by those skilled in the art that changes in form and details may be made therein without departing from the spirit and scope of the invention.

What is claimed is:

1. A method for mounting a fuel tank storing a compressed fuel gas on an automobile, comprising:

a tank installing step wherein said fuel tank is placed on a tank supporting frame and tightened to said frame by a belt;

a pipe and seal installing step, wherein at least one pipe and at least one leak preventing seal are mounted to the tank;

a frame fixing step wherein said tank supporting frame installed with said fuel tank is mounted and fixed on a car body; and a pipe connecting step wherein said at least one pipe is connected to pipes mounted on a side portion of said automobile, wherein said frame fixing step includes the step of inserting said tank supporting frame installed with said fuel tank through a car body opening and the step of fixing said tank supporting frame on a rear floor of the car body, wherein said at least one pipe passes through said rear floor of the car body.

* * * * *